I. LEO.
COOLING DEVICE FOR AUTOMOBILE TIRES.
APPLICATION FILED APR. 13, 1917.

1,253,259.

Patented Jan. 15, 1918.

INVENTOR
ISAAC LEO.

UNITED STATES PATENT OFFICE.

ISAAC LEO, OF CHICAGO, ILLINOIS.

COOLING DEVICE FOR AUTOMOBILE-TIRES.

1,253,259.  Specification of Letters Patent.  Patented Jan. 15, 1918.

Application filed April 13, 1917. Serial No. 161,838.

*To all whom it may concern:*

Be it known that I, ISAAC LEO, of the city of Chicago, in the State of Illinois, United States of America, have invented certain new and useful Improvements in Cooling Devices for Automobile-Tires, of which the following is the specification.

My invention relates to improvements in cooling devices for automobile tires and the object of the invention is to devise a simple, cheap and effective means which will occupy a minimum space within the wall of a tire casing and neutralize the effect of heat generated by friction on the surface of the tire and it consists essentially of the following arrangement and construction of parts as hereinafter more particularly explained.

In the drawings like letters of reference indicate corresponding parts in each figure.

Figure 1:
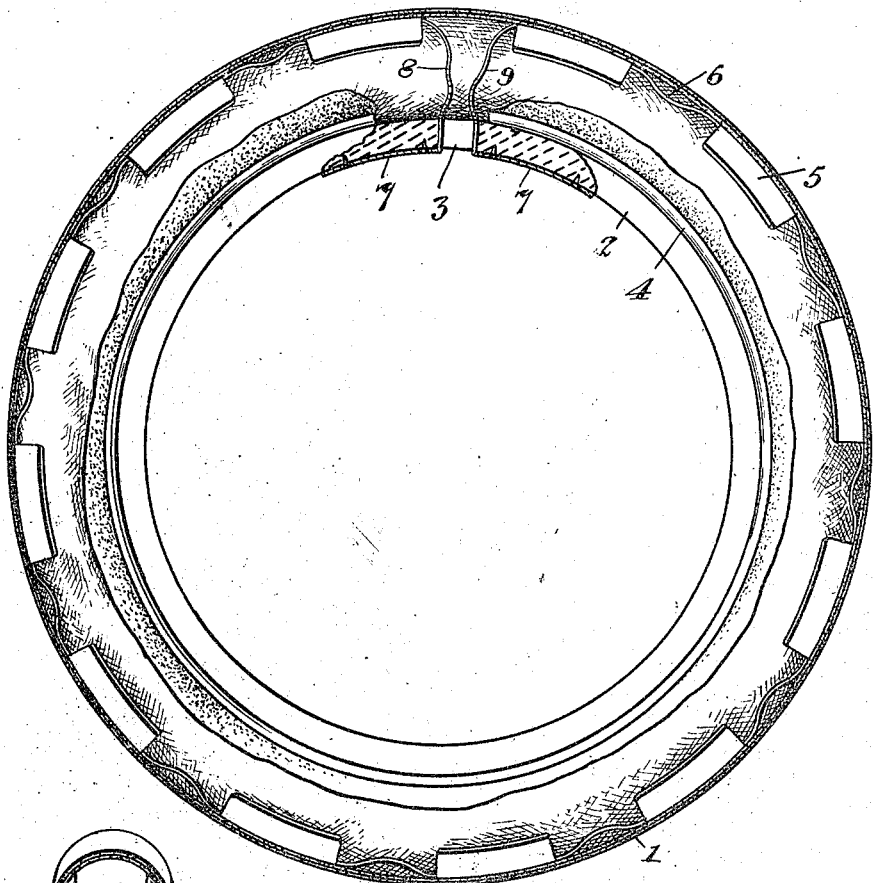
Figure 1, is a face elevation of a tire and felly showing the outer layer of the wall of the tire casing broken away to exhibit my device.
Figure 2:
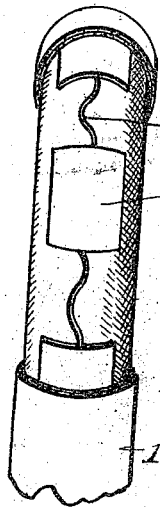
Fig. 2, is an edge view of a portion of a tire, with the outer layers of canvas broken away to exhibit my device.

1 indicates the outer casing of a tire, the outer portion of which is formed by a plurality of layers of canvas which are built up around the tire in the usual way. 2 indicates the felly provided with an orifice 3. 4 indicates a rim connecting the tire to the felly. 5 indicate a series of metallic plates, which are inserted, when the tire is being built up, between two layers of the canvas winding at suitable distances apart all around the tread of the tire. These plates are preferably formed of aluminum, which metal has a very high heat conducting quality.

6 indicate flexible connectors connecting the plates together, such connectors also being formed of aluminum and crimped or waved in order to allow of free movement of the plates as the tire revolves into contact with the ground. The plates 5 are connected together successively by the connectors 6 extending from each side of the orifice 3. 7 indicate plates secured to the felly at each side of the orifice 3 so as to be exposed to the cooling action of the outer atmosphere. 8 and 9 indicate flexible connectors also formed of aluminum connecting the end plates 5 with each of the plates 7. As the tire revolves in frictional contact with the ground the outer surface of the tire becomes heated by frictional contact. Such heat is absorbed by the plates 5 and is conducted by the connectors 6 and 8 and 9 to the plates 7, which plates are constantly subject to the cooling action of the atmosphere.

From this description it will be seen that I have devised a very simple device whereby heat generated by friction on the tire is absorbed and neutralized so that it will not have any detrimental effect upon air in the interior of the tire expanding the air so as to produce undue pressure upon the walls of the tire.

What I claim as my invention is.

1. In an automobile tire, the combination of the outer casing, of a heat absorbing metal plate located in the wall of the tire, and heat conducting means leading from said metal plate to the exterior atmosphere.

2. In an automobile tire, the combination with the outer casing, of a series of heat absorbing metallic plates embedded in the wall of the tire at suitable distances apart all around the periphery of the tire, and heat conducting means connecting the plates together and leading to the exterior of the tire into contact with the outer atmosphere.

3. In an automobile tire, the combination with the outer casing, of a series of aluminum plates embedded in the casing all around the periphery of the tire, flexible wire connectors extending between the plates intermediate of the end plates of said series, aluminum plates secured to the felly, and flexible connectors of heat conducting material connecting the end plates of the series embedded in the tire, respectively with the plates carried by the felly.

4. In a device of the class described, a tire cooling device comprising a series of plates and flexible connecting means of heat absorbing material adapted to be embedded in the wall of the tire casing, and heat conducting plates adapted to be secured to the felly, and flexible heat conducting connecting means between the embedded end plates and the plates of the felly.

ISAAC LEO.

Witnesses:
  B. BOYD,
  M. EGAN.